(No Model.)
J. E. SEARING.
FRAME FOR EYEGLASSES AND SPECTACLES.
No. 475,615. Patented May 24, 1892.
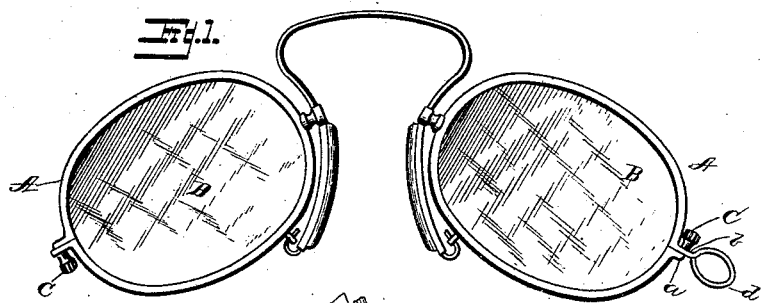
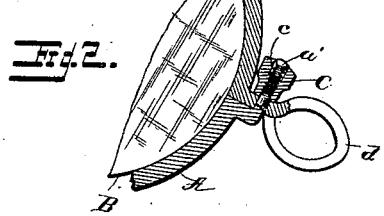
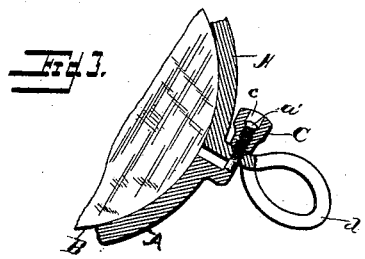
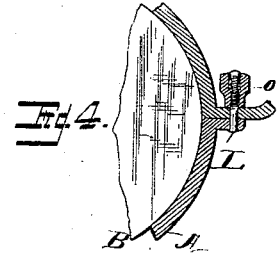
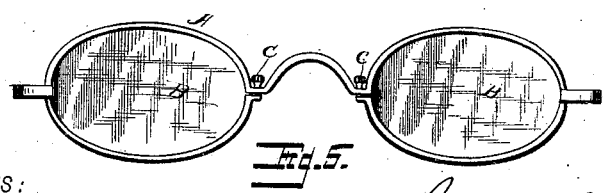
WITNESSES:
J. M. Fowler Jr.
Thomas Durant
INVENTOR
James E. Searing
BY
Church & Church
ATTORNEYS.
THE NORRIS PETERS CO., PHOTO-LITHO., WASHINGTON, D. C.

UNITED STATES PATENT OFFICE.

JAMES E. SEARING, OF MOUNT VERNON, NEW YORK.

FRAME FOR EYEGLASSES AND SPECTACLES.

SPECIFICATION forming part of Letters Patent No. 475,615, dated May 24, 1892.

Application filed February 27, 1892. Serial No. 423,050. (No model.)

*To all whom it may concern:*

Be it known that I, JAMES E. SEARING, of Mount Vernon, in the county of Westchester and State of New York, have invented certain new and useful Improvements in Frames for Eyeglasses and Spectacles; and I do hereby declare the following to be a full, clear, and exact description of the same, reference being had to the accompanying drawings, forming a part of this specification, and to the letters of reference marked thereon.

On the 9th day of April, 1889, I obtained two patents—*i. e.*, Nos. 400,956 and 400,957—for improvements in the construction of frames for spectacles and eyeglasses, one of the features of which consisted in the employment of nuts or screws which could be turned by the fingers to regulate the size of the opening of the lens-rim, so as to permit of the ready application and removal of a lens when necessary or desired without the use of tools and without requiring any special skill on the part of the operator. In the preferred construction the lens-rim was provided with a groove on its inner circumference to receive the edge of the lens, and one of its ends was formed with or had attached to it a screw-threaded portion which passed through an opening in the opposite proximate end and received the adjusting-nut on its extremity. When care was exercised, it was possible to adjust the nut on the screw end so as to enlarge the lens-opening sufficiently to enable the lens to be taken out and replaced, but in the manipulation of the screw there was liability of its coming off and being lost.

One of the objects of my present invention, therefore, is to provide an adjusting means for expanding or contracting the lens-opening that shall not be susceptible of being detached and lost, but that shall form a permanent part of the frame. This part of my invention may be carried out in various ways. For instance, where a nut is to co-operate with a screw-threaded portion of the rim, as in my former patented structures, I may in forming the nut make a screw-threaded opening entirely through it and then, in any suitable manner, as by boring, remove or cut away a few threads near one end of the opening, and after the nut is screwed onto its co-operating screw-threaded portion upset the end of the latter and thus prevent the screw from being turned entirely off.

In the accompanying drawings, Figure 1 represents a view of a pair of eyeglasses embodying my present improvements; Fig. 2, a sectional view of one of the lens-rims, showing the position of the adjusting device when the lens is in place. Fig. 3 is a similar view showing the position of the adjusting device when the lens-rim is sprung open and the lens is removed. Fig. 4 illustrates a modification. Fig. 5 is a view of a spectacle-frame, showing the application of my improved adjusting device thereto.

Similar letters of reference in the several figures indicate the same parts.

The body of the lens-rim A is formed of one piece of metal, grooved as usual to receive the edge of the lens B and having one of its ends offset, as at $a$, to correspond to a similar offset on the opposite end portion at $b$, and terminating in screw-threaded portion $a'$, which passes through an opening in the part $b$ and receives the nut C above said part $b$. The metal strip of which the rim is composed is extended beyond the part $b$ and formed into a loop or handle $d$, lying in substantially the same plane as the rim, as shown.

The opening through the nut C is screw-threaded for the greater portion of its length; but at $c$ it is bored out or enlarged, so as to accommodate the enlarged extremity of the screw-threaded part $a'$, made by upsetting the latter slightly in a well-known manner.

When the nut C is turned in one direction, it draws upon the screw-threaded portion $a'$ and tends to bring the parts $a$ and $b$ together, thereby closing the rim tightly about the lens and holding the latter securely. On turning the nut in the opposite direction, however, the parts $a$ and $b$ will separate, owing to the elasticity of the rim, thereby permitting the lens to be readily removed. The enlarged end of the screw-threaded part $a'$, co-operating with the bored-out portion of the opening in the nut, prevents the nut from being entirely unscrewed and lost. This feature of making the nut a permanent part of the frame and non-detachable therefrom is of the greatest importance in practice, because it enables inexperienced persons to remove and replace one or both lenses and does not subject them to the liability of rendering their glasses entirely useless by the loss of the nut, for, as will readily be appreciated, it would be more difficult for an ordinary farmer or mechanic to replace a part as small as this nut when once lost than it would be to get a new pair of glasses.

Instead of the nut secured as shown in Figs. 1, 2, and 3, a screw-threaded pin $l$, Fig. 4, might be secured at one end firmly to a lug or offset formed upon one part of the lens-rim and caused to pass through an opening in a lug or offset formed upon or attached to the other part of the lens-rim and provided with a nut $o$, applied and secured like that shown in Figs. 1, 2, and 3.

The spectacle-frame shown in Fig. 5 of the drawings is the same as that shown in my patent, No. 400,956, before referred to, with the difference, however, that the nuts, instead of being detachable, as are those of said patent, are constructed and applied so as to form permanent non-detachable parts of the frame, as shown in Figs. 1, 2, and 3 herein.

Having thus described my invention, what I claim as new is—

1. In a spectacle or eyeglass frame, the combination, with the divided lens-rim, of the nut and co-operating screw for adjusting the sides of the rim toward each other, held in operative engagement when at the outward limit of their movement, whereby the accidental loss of the same is prevented.

2. In the herein-described spectacle or eyeglass frame, the combination, with the divided lens-rim having a screw-threaded projection at one end and an opening near the other end through which said screw-threaded projection passes, of an adjusting-nut applied to said screw-threaded projection and having the opening through it enlarged at one end to accommodate a head or flange formed upon the end of the screw-threaded projection, substantially as described.

3. The lens-rim consisting of the integral piece of metal bent to inclose a lens and further bent to form the loop or handle, as described, and having the offsets $a$ $b$ and screw-threaded projection $a$ passing through an opening in the portion $b$, in combination with the screw-nut having a portion of its opening enlarged to receive the flanged or upset end of the screw-threaded projection, substantially as described, and for the purpose specified.

JAMES E. SEARING.

Witnesses
ALEX. S. STEUART,
THOMAS DURANT.